E. C. SHILLING.
CUSHION TIRE.
APPLICATION FILED APR. 7, 1910.
974,303.
Patented Nov. 1, 1910.
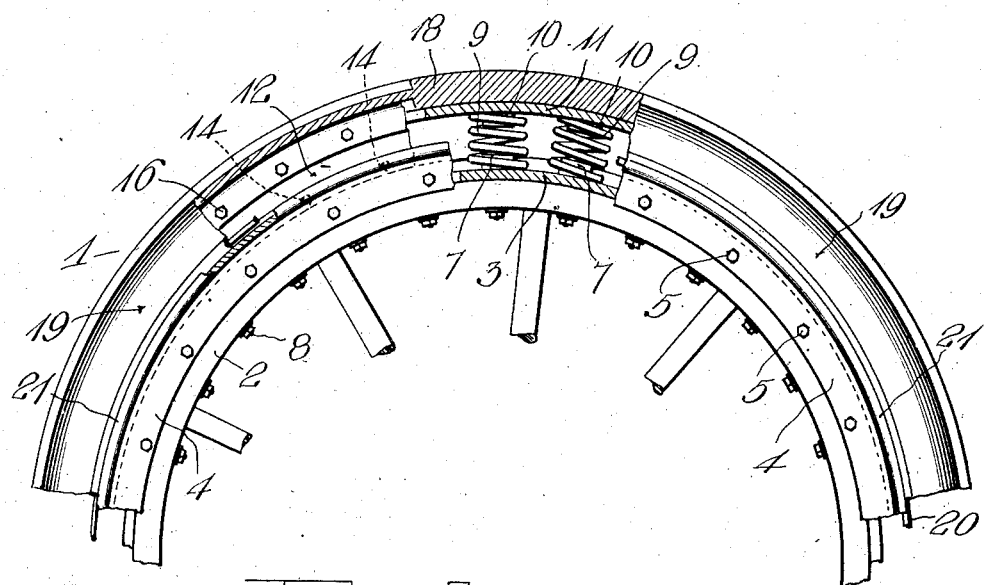

UNITED STATES PATENT OFFICE.

EDWARD C. SHILLING, OF COLUMBUS, OHIO.

CUSHION-TIRE.

974,303.      Specification of Letters Patent.      Patented Nov. 1, 1910.

Application filed April 7, 1910. Serial No. 553,968.

*To all whom it may concern:*

Be it known that I, EDWARD C. SHILLING, a citizen of the United States, residing at Columbus, in the county of Franklin and State of Ohio, have invented certain new and useful Improvements in Cushion-Tires; and I do declare the following to be a full, clear, and exact description of the invention, such as will enable others skilled in the art to which it appertains to make and use the same.

This invention relates to improvements in cushion tires.

One object of the invention is to provide an improved construction of cushion tire having all the advantages of a pneumatic tire without the disadvantages possessed by the latter.

Another object is to provide a tire having means whereby the interior structure of the tire will be covered and protected from injury and from dust or other foreign matter.

With the foregoing and other objects in view, the invention consists of certain novel features of construction, combination and arrangement of parts, as will be more fully described and particularly pointed out in the appended claims.

In the accompanying drawings, Figure 1 is partly a side view and partly a longitudinal section of a portion of a wheel and tire constructed in accordance with the invention; Fig. 2 is an enlarged cross sectional view of the same; Fig. 3 is a side view of one of the clamping rings for the shields formed by the sides of the outer tire.

Referring more particularly to the drawings, 1 denotes a wheel which may be of any suitable construction, to the spokes of which is connected a rim or felly 2. Around the rim or felly 2 is arranged an inner metal tire 3. To the opposite edges of the tire 3 are secured inner annular side plates 4, said plates being preferably secured to the tire 3 by fastening screws 5, as shown. On the inner surface of the side plates 5 are formed annular stop flanges 6 which bear against the outer surface of the tire 3 and aid in holding the side plates 4 in place.

On the outer face of the tire 3 is arranged a series of lugs 7 which are held in place by bolts 8 passed therethrough and through the tire 3 and felly 2 of the wheel. With the lugs 7 are engaged the inner ends of a series of short coiled springs 9, the outer ends of which are engaged with lugs 10 formed on the inner side of an outer metal tire 11 which is arranged around the inner tire and spaced a considerable distance therefrom, as shown. To the outer edges of the tire 11 are secured outer annular side plates 12, the outer faces of which are slidably engaged with the inner faces of the side plates 4. In the outer faces of the side plates 12 are formed a series of sockets 13, with which are engaged anti-frictional bearing balls 14. The balls 14 also engage the inner surface of the side plates 4, thus providing an anti-frictional engagement between said plates 4 and the plates 12. The outer portions of the inner faces of the plates 12 are provided with annular grooves 15 which receive the opposite side edges of the outer tire 11 to which the plates 12 are secured by fastening screws 16, as shown. The outer edges of the plates 12 have formed thereon inwardly projecting annular flanges 17 the inner edges of which are beveled or inclined downwardly and inwardly and form with the outer surface of the tire 11, an annular dove-tail shaped groove, the purpose of which will be hereinafter described.

Arranged around the outer tire 11, is a solid rubber tire or shield 18 having on its opposite inner edges a dove-tail formation which is adapted to engage the dove-tail shaped groove or channel formed by the beveled flanges 17 and the tire 11. This dove-tail engagement between the rubber tire 18 and the outer metal tire 11 securely holds the rubber tire in place on the wheel. On the opposite side edges of the rubber tire 18 above the dove-tailed portions are formed annular flexible extensions 19, the inner edges of which are secured by clamping rings or bands 20 to laterally projecting annular flanges 21 formed on the outer sides of the side plates 4 at their outer edges, as shown. The flanges 21 are curved in cross section or in the form of channels into which the inner edges of the extensions 19 are securely fastened by the clamping rings or bands 20. The bands 20 are drawn into clamping engagement with the edges of the extensions 19 and the flanges 21 preferably by means of the threaded offset extensions 22 formed on one end of the band and adapted to be engaged with a right angularly formed eye 23 on the opposite end of the band. With the threaded end 22, after the same has been inserted through the eye 23, is engaged a clamping nut 25 whereby the ends of the rim or band are drawn together into operative engagement with the parts, as described.

By bringing the extensions 19 of the rubber tire back over the side plates and securing the edges of said extensions in the manner described, flexible shields are provided which cover the joint or sliding connection between the side plates 4 and 12 and thus prevent the entrance of dust or other foreign matter to the inner portion of the cushion tire. The flexibility or elasticity of the extensions 19 permits the free movement of the outer portion of the tire on the inner portions when pressure is applied thereto.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. A cushion tire for wheels comprising, an inner metal tire adapted to be secured to the rim of the wheel, an outer metal tire arranged around said inner metal tire and spaced radially therefrom, a series of coiled springs arranged between said tires, annular side plates secured to the opposite edges of said inner metal tire and each having a laterally extending grooved flange on its outer face, annular side plates secured to the edges of said outer metal tire and having radially sliding engagement with said first mentioned side plates, an elastic tire secured around said outer metal tire, flexible shields formed on the opposite edges of said elastic tire having their free edges inserted in said grooved flange of the first mentioned side plates and means for clamping said edges in said groove.

2. The combination with a wheel having a metal tire secured to the rim thereof, an outer metal tire arranged around and spaced from said rim secured tire, a series of springs arranged between said metal tires, inner annular side plates secured to the edges of said inner metal tire, outer annular side plates secured to the edges of said outer metal tire and having sliding engagement with said inner side plates, said outer plates having annular grooves on their inner faces for engagement with the outer metal tire and provided on their outer edges with inwardly extending flanges beveled downwardly and inwardly to form in connection with said outer metal tire dove-tailed grooves, a rubber tire having annular flexible extensions formed intermediately between its inner and outer edges on its opposite sides, the inner edges of said rubber tire below said flexible extensions being beveled outwardly to form interlocking members for engagement with said dove-tailed grooves and means for detachably connecting the free edges of said flexible extensions with the flanges attached to said inner tire.

In testimony whereof I have hereunto set my hand in presence of two subscribing witnesses.

EDWARD C. SHILLING.

Witnesses:
H. E. STAFFORD,
E. L. McCUNE.